J. NORTH.

MACHINE FOR MENDING STEREOTYPE PLATES.

No. 10,710. Reissued Apr. 6, 1886.

WITNESSES:

W. W. Hollingsworth

John C. Hemon

INVENTOR:

Jacob North

BY Munn & Co

ATTORNEYS.

N. PETERS, Photo-Lithographer, Washington, D. C.

UNITED STATES PATENT OFFICE.

JACOB NORTH, OF LINCOLN, NEBRASKA.

MACHINE FOR MENDING STEREOTYPE-PLATES.

SPECIFICATION forming part of Reissued Letters Patent No. 10,710, dated April 6, 1886.

Original No. 333,325, dated December 29, 1885. Application for reissue filed February 18, 1886. Serial No. 192,449.

*To all whom it may concern:*

Be it known that I, JACOB NORTH, of Lincoln, county of Lancaster, Nebraska, have invented a new and Improved Machine for Mending Stereotype and Electrotype Plates, of which the following is a full, clear, and exact description.

The object of my invention is to provide a new and improved machine for mending stereotype and electrotype plates—that is, for removing the characters that are wrong and replacing them by others.

The invention consists in the construction and arrangement of parts, as will be hereinafter fully described and claimed.

Reference is to be had to the accompanying drawings, forming part of this specification, in which similar letters of reference indicate corresponding parts in all the figures.

Figure 1:
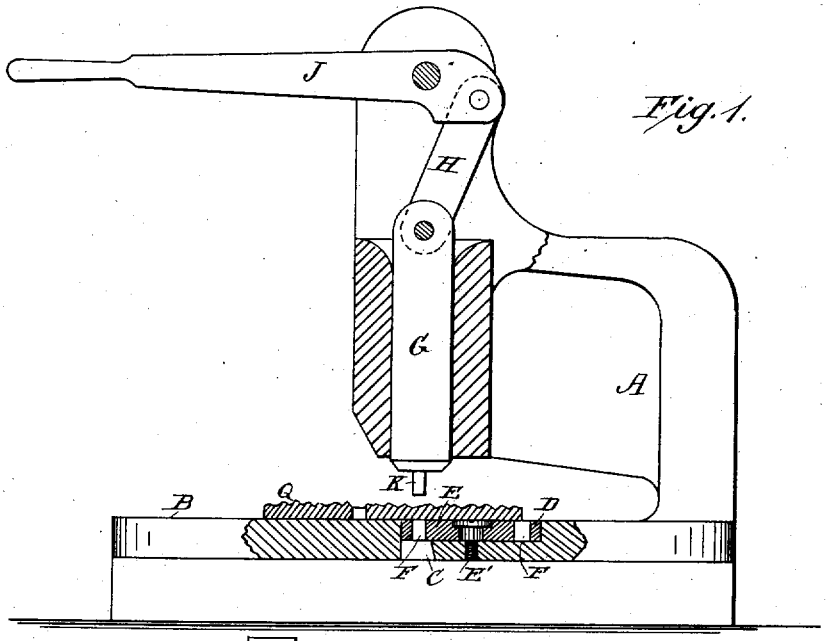
Figure 2:
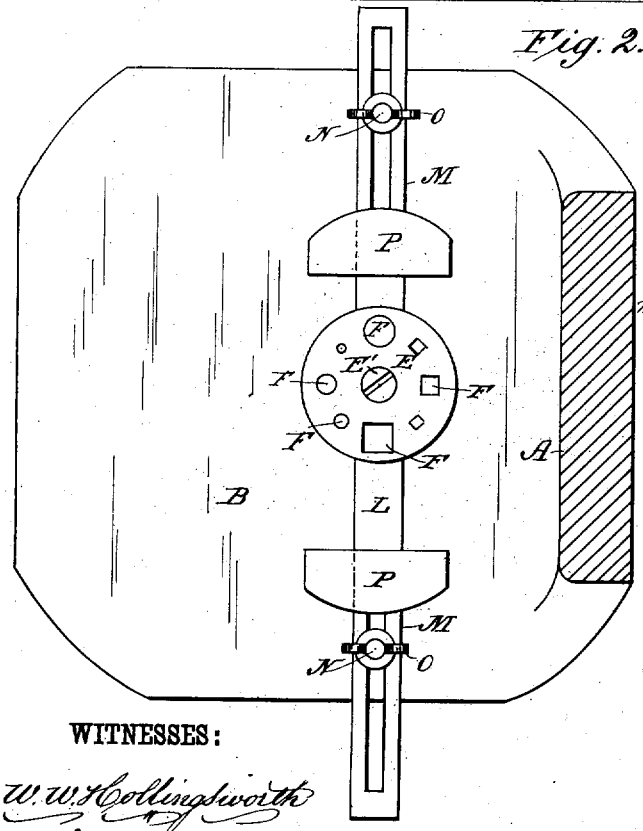
Figure 3:
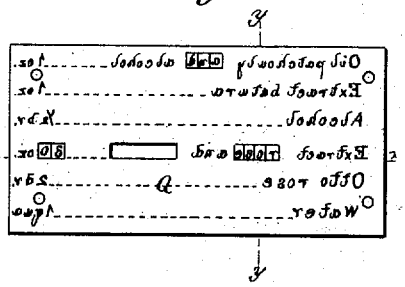
Figure 4:
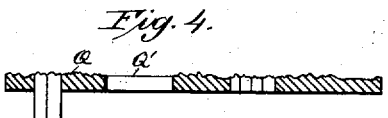
Figure 5:
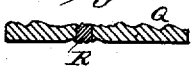

Figure 1 is a longitudinal sectional elevation of my improved machine for mending stereotype or electrotype plates. Fig. 2 is a plan view of the same, parts being in section. Fig. 3 is a plan view of a plate partly mended. Fig. 4 is a longitudinal sectional elevation of the same on line *x x*, Fig. 3. Fig. 5 is a cross-sectional elevation of the same on the line *y y*, Fig. 3.

The elbow-standard A is formed on a base, B, having an aperture, C, and a recess, D, in its top, in which recess a revolving die, E, is held by a screw or pivot, E′, the top of which is flush with the top of the base. The die E has a series of apertures, F, of different shapes and sizes.

A plunger, G, is arranged to slide in the standard A, and has its upper end connected by a link, H, with a hand-lever, J, pivoted on the standard A, thus forming a toggle-lever. A punch, K, is secured on the lower end of the plunger G.

In grooves L in the top of the base B two sliding bars, M, are placed, which have longitudinal slots, through which screws N project from the base, on which screws nuts O are screwed. Clamping-jaws P are secured on the inner adjacent ends of the bars M.

The operation is as follows: The die E is turned to bring an aperture, F, of the same shape and size as the aperture to be made in the stereotype-plate Q, under the punch K, and a suitable punch is secured on the lower end of the plunger, and the plate Q is placed on the die. The lever J is raised, and thereby the punch K is moved downward and through the plate Q, thus making a hole of the desired size in the plate. This is repeated until a slot, Q′, is formed. The type R are then placed in the slot in such a manner that their faces are flush with the faces of the characters on the plate Q. The projecting parts of the type on the back of the plate are then cut off flush with the back of the plate.

The holes, slots, &c., are so made that the type fits snugly in the same.

The plate while being punched is held by the jaws P.

Having thus described my invention, I claim as new and desire to secure by Letters Patent—

1. A machine for mending stereotype and electrotype plates, consisting in the base B, standard A, having the plunger G, the revoluble die E on the base below the plunger, and having a series of type-sized apertures, F, and the clamps on opposite sides or the die E, substantially as set forth.

2. In a machine for mending stereotype and electrotype plates, the combination of the base having a circular recess, and the circular die E therein flush with the surface of the base, and provided with a series of type-sized apertures, and a series of type-sized male dies corresponding in size to the said apertures, substantially as set forth.

3. In a machine for mending stereotype and electrotype plates, the combination, with base B, having the grooves L and central recess, D, between the same, of the die E in the said central recess, and the slotted bars M, adapted to slide in the slots L, and provided with clamping-jaws P and set-screws N O, as set forth.

JACOB NORTH.

Witnesses:
JAS. G. SAYER,
CHARLES E. COMSTOCK.